United States Patent [19]

Pelkey

[11] Patent Number: 4,997,459

[45] Date of Patent: Mar. 5, 1991

[54] GAS PRESSURE RELIEF SYSTEM
[75] Inventor: Mark J. Pelkey, Clarence, N.Y.
[73] Assignee: Enerop Corporation, Buffalo, N.Y.
[21] Appl. No.: 538,912
[22] Filed: Jun. 15, 1990
[51] Int. Cl.[5] .............................................. F17D 1/04
[52] U.S. Cl. ..................................... 48/191; 48/192; 137/115; 251/24
[58] Field of Search .................. 48/191, 192; 137/115; 251/24

[56] References Cited

U.S. PATENT DOCUMENTS

| 831,262 | 9/1906 | Cain | 48/191 |
|---|---|---|---|
| 1,511,752 | 10/1974 | Carter | 48/191 |
| 2,306,060 | 12/1942 | Jacobsson | 48/191 |
| 2,631,931 | 3/1953 | Shaeffer et al. | 48/191 |
| 3,023,093 | 2/1962 | Hughes | 48/191 |
| 3,035,607 | 5/1962 | Quennseville | 137/115 |
| 3,273,583 | 9/1966 | Carlton | 137/115 |
| 3,386,466 | 6/1968 | Brunsing | 251/24 |

Primary Examiner—Peter Kratz
Attorney, Agent, or Firm—James J. Ralabate

[57] ABSTRACT

The gas distribution system has a main gas line in gas flow connection with several components including a gas pressure safety structure. A pressure regulator is located on a front or forward portion of the main gas line and reduces the gas pressure at a point in the main gas line subsequent to the pressure regulator. There is an auxiliary gas line that extends from a point on the main line before the gas pressure regulator to the gas pressure safety structure. The gas pressure safety structure has in gas flow connection a source pressure regulator, as inspirator and a pressure sensing pilot all in gas flow connection with a gas venting device. Upon overpressurization the pressure sensing pilot will be activated and the inspirator will cause a vacuum to be formed in its connection with the gas venting device. This vacuum will open the gas venting device to permit the excess gas to be vented to the atmosphere.

27 Claims, 3 Drawing Sheets

GAS PRESSURE RELIEF SYSTEM

This invention relates to a gas distribution system and, more specifically, to a novel gas distribution system containing a pressure safety device.

BACKGROUND OF THE INVENTION

In the distribution of natural gas to customers, gas distribution companies provide a main gas line while maintaining the pressure of the gas at about 20 to 60 pounds per square inch (PSIG). Since most home appliances are programmed to operate under gas pressures of about ¼ PSIG, the gas pressure directed from the main gas line to each home must be reduced to this lower pressure, i.e. ¼ PSIG. To accomplish this, pressure regulators are placed in the gas line to reduce the gas pressure from about 20 to 60 PSIG to ¼ PSIG to make it suitable for customer use. These pressure regulators are either located at the service entrance for each individual customer or in a district regulator station that serves a number of customers. To protect against overpressurization of the gas supplied to customers because of regulator failure, a safety device is required downstream of the pressure regulator. This safety device is located between the customers' gas lines and the pressure regulator. These safety devices can be installed to act at either individual service regulators or at district pressure regulators. Individual service regulators are equipped with internal relief valves which automatically vent any excess gas (beyond about ¼ PSIG) to the atmosphere. The internal relief valves used are simple, reliable spring-operated devices similar in design to the pressure relief valve located on hot water tanks.

District pressure regulators on the other hand are usually larger than individual service regulators. There are a number of different devices that have been used to provide overpressure protection. These include safety shut off valves, monitor regulators and relief valves and all are generally located downstream of the district pressure regulator. The safety shut off valve will shut off gas flow in the event of a regulator failure and therefore are impractical since their use requires relighting every customer's appliances. The monitor regulator's function is to take over the pressure reduction activity in the event of district pressure regulator failure. The monitor regulators have substantially the same mechanical structure as district pressure regulators. A problem with the use of monitor regulators is that they suffer from the same failure cause as the district pressure regulator. Thus, dirt or other debris passing through the piping system is likely to have the same adverse effect on both the district pressure regulator and the monitor regulator. This can result in the failure of both devices and subsequent overpressurization of the downstream system.

Relief valves are provided to sense the downstream pressure in a piping system and are designed to open when the pressure exceeds a predetermined setpoint. In a stable and normal operating mode these relief valves are in a closed position and no gas flows through them. Upon overpressurization the relief valve opens and excess gas is vented to the atmosphere. It is common to install relief valves with a setpoint of ⅔ PSIG, and when the district pressure regulator fails to keep the pressure below this ⅔ PSIG setpoint, the relief valve opens to vent the gas. Every district pressure regulator has an associated maximum capacity. Given a maximum inlet pressure, it is possible to calculate the peak gas volume that can pass through a district pressure regulator. The relief valve associated with a district pressure regulator must have a greater capacity than the regulator. As long as this size relationship is maintained, the relief valve will have the ability to vent all of the excess gas that the district pressure regulator is capable of allowing into the system. For this reason relief valves generally have a greater diameter than their associated regulators. It is common to install a four or six inch diameter relief valve downstream of a two inch diameter regulator. The use of a relief valve as the safety device in this type system appears to be the most practical of the prior art devices. The present invention relates to a system and a safety device utilizing a novel pressure relief valve configuration.

There are three basic types of relief valves, liquid sealed, self operated and pilot operated. In each case, in a stable system, gas is restrained by a mechanical sealing mechanism. Liquid sealed relief devices are the simplest of the three. A large tank of liquid, usually an oil similar to motor oil, is placed near the piping system downstream of a district pressure regulator. A branch line from the downstream system is run to the top of the tank. The branch line is turned downward with the open end of the line ending below the surface of the liquid. As long as the head pressure of the liquid is greater than the gas pressure in the line, the system stays sealed. If the gas pressure exceeds the head pressure of the liquid, it forces the liquid out of the tank and allows the gas to flow to the atmosphere. Setpoint can be controlled bY varying the level of the liquid in the tank. Liquid seal relief devices are very messy. They are not appropriate in an environmentally conscious society. They also have the disadvantage that they will not reseal themselves if system pressures return to normal. They will continue to allow gas to flow to the atmosphere until someone refills them with the liquid.

In self operated relief valves a plug and orifice combination is common. They are configured much the same as a standard water faucet with the water sealed behind the orifice by a rubber plug. However, instead of forcing the plug into place with a threaded, manually operated stem, a series of weights or a spring holds the plug down. By carefully controlling the amount of weight or spring compression holding the plug into place, it is possible to design a device to open at any desired internal system pressure. Self operated relief valves open when the pressure per square inch acting upward on the area on the bottom of the plug exceeds the down force generated by the weights or spring compression attempting to hold the plug down. Self operated relief valves do have the advantage that they will reseal themselves once system pressures return to normal.

Self operated relief valves have an inherent problem called build up. There is a relationship between setpoint, the volume of gas that needs to be vented and the amount of plug movement required to vent that gas. When the system pressure is equal to setpoint, a state of equilibrium exists. A slight increase in system pressure results in a slight upward movement of the relief valve's plug. It follows that a significant movement of the valve plug requires a significant increase in system pressure. This increase is called build up. It is common to design a self operated relief valve to have a set point of ⅔ PSIG and allow a build up to 2 PSIG before the desired maximum capacity is achieved.

Conventional prior art pilot operated relief valves use gas pressure to hold the sealing mechanism in place. The piping system being protected has traditionally been the source of this pressure. The down force required to keep these valves closed had been generated by designing a valve where the underside of the plug had a smaller area than the upper side. The introduction of the same pressure per square inch to both sides of such a plug results in a net down force proportional to the difference in the two surface areas. This same basic relationship has been used regardless of the sealing mechanism. This difference in surface areas approach has been used to operate sleeve type and piston type valves.

In high pressure applications a slight difference in surface areas results in a significant net sealing force. In low pressure applications a much larger difference in surface areas is required to achieve an acceptable net sealing force. This has led low pressure relief valve designers to use complex and expensive castings to create functional pilot operated relief valves.

There are several known systems for conveying and supplying natural gas. There are also, as noted earlier, alternate means for controlling overpressurization of the gas along the supply lines. In U.S. Pat. No. 323,840 (Westinghouse I) a method of conveying gas is disclosed wherein a low gas pressure is maintained in the pipelines to reduce the tendency of leakage or rupture of the pipes. Westinghouse I does not address the problem of automatically controlling overpressurization with a safety device such as a relief valve that operates in cooperation with an inspirator. Westinghouse I is more concerned with conveying gas by exhaustion from one to another section of a conducting main in which an average pressure below that of the atmosphere is maintained. In U.S. Pat. No. 328,368 (Westinghouse II) a process for reducing pressure by an exhausting device such as a reciprocating or rotary pump or blower is disclosed. This exhausting device is driven by steam, compressed air or high pressure gas. The gas is conveyed in pipes or a jet apparatus activated by high pressure gas located adjacent to the delivery end of each of separate compartments. The exhausted gas is forced through a pipe into the receiving end of the next succeeding compartment thus effecting a reduction in pressure. In U.S. Pat. No. 4,622,999 (Ray) a gas flow control system which utilizes a pilot control of the main gas valves and a boosted gas pressure as the motive fluid is disclosed. Ray's system comprises a main diaphragm control valve, a second similar valve which is a diaphragm operated shut off valve and a third diaphragm valve which is in a vent line connected to the line between the other two valves. A booster pump is provided in Ray's system which draws on the incoming gas itself and boosts its pressure so that its discharge pressure can be used for operation of the valves and all of the other components of the system. Ray's system does not utilize an auxiliary gas line to operate the venting means nor does Ray suggest the use of an inspirator to effect a vacuum which activates the gas venting means.

SUMMARY OF THE INVENTION

It is therefore an object of this invention to provide a novel gas pressure safety system devoid of the above-noted disadvantages.

Another object of this invention is to provide a system comprising a novel pressure relief apparatus that is relatively inexpensive yet very effective.

Still another object of this invention is to provide a novel pressure relief safety system that can be utilized in most gas distribution networks.

Still a further object of this invention is to provide a safety system and structure to protect downstream gas networks or systems from overpressurization.

Still yet a further object of this invention is to provide a gas pressure safety system and structure where the main system pressure is not required to operate the valve therefore avoiding pressure build up concerns such as occurs in a spring or weight operated relief valve systems.

Yet another object of this invention is to provide a novel pressure relief safety system utilizing a relief valve and a vacuum forming inspirator.

Yet still a further object of this invention is to provide a gas pressure safety system that utilizes gas pressure brought from the upstream side of a district pressure regulator.

Yet still another object of this invention is to provide a novel system wherein excess gas is vented to the atmosphere during system pressure problem situations and wherein the system automatically returns to normal upon a normalization of system gas pressure.

These and other objects which will become apparent upon a further reading of this disclosure, are accomplished by providing a novel gas distribution system containing a district or other pressure regulator in gas flow connection with a unique pressure safety device. This safety device is in gas flow connection to a gas venting means such as an Axial Flow Valve (A.F.V.). The safety device comprises:

A. at least one vacuum forming inspirator;
B. at least one pressure sensing pilot; and
C. at least one source pressure regulator.

The principal functions in this system of each component in the novel pressure safety device are:

A. Inspirator — has three piping ports, an inlet port, an exhaust port and a jacket port. A gas streams in through the inlet port and exiting through the exhaust port creates a negative pressure at the jacket port. It is used as a vacuum source to draw open low pressure relief valves. The inspirator generates its peak vacuum of about $-6.1$ PSIG at the jacket port with an inlet pressure between 5.0 and 7.0 PSIG;

B. Pressure sensing pilot — used to determine when it is appropriate for gas to flow through the inspirator, opens as it senses excess gas pressure in the piping system; and C. Source pressure regulator — reduces pressure from upstream side of district pressure regulator from about 20 to 60 PSIG (or the like) to about 6.0 PSIG.

While the A.F.V. is a part of the present system, it does not comprise a major component of the novel relief valve structure used in the system of the present invention.

The axial flow valve used can be any suitable gas relief valve such as the Series 300 or 600 available from American Meter Company of Philadelphia, Pa. This valve vents excess gas from the low pressure distribution system to atmosphere during the failure of an associated district pressure regulator. The internal sealing mechanism consists of a rubber sleeve that has the ability to seal against a cast steel cage. The position of the sleeve (open or closed) is controlled by the pressure present in a chamber behind the sleeve (jacket pressure). In this system, a jacket pressure of +6.0 PSIG is used to seal the valve closed. A jacket pressure of −6.1 PSIG is used to draw the sleeve away from the cage thereby opening the valve. The inspirator used is basically a rectangular structure having a T-shaped conduit forming thereby as above noted three ports, an inlet port, an exhaust port and a jacket port. The passage of moving gas therethrough creates a vacuum effect at the jacket point. This vacuum acts upon the axial flow valve elastomeric jacket in a manner that allows gas to vent therefrom. Any suitable inspirator may be used such as an Inspirator Controlled Manifold manufactured by American Meter Co. As noted conceptually, the inspirator consists of a block of steel with a T-shaped set of passageways bored through it. The straight run through this "T" starts at the inlet port and ends at the exhaust port. The branch run ends at the jacket port. A precisely contoured restriction (a venturi) is located in the straight passageway immediately downstream of the inlet port. One of the properties of flowing gas is that any increase in velocity results in a proportional decrease in pressure. The gas flowing through the restriction accelerates. This results in a drop in pressure immediately downstream of the restriction. The branch run in the passageway meets the straight run at this point. This places the region of lowest pressure, in this case −6.1 PSIG, at the end of the passageway leading to the chamber behind the relief valve sleeve. The presence of this −6.1 PSIG behind the sleeve results in the opening of the relief valve and the exhaust of all excess gas to the atmosphere. When the system is in a stable condition, and there is no flow through the restriction, the system equalizes with an internal pressure of 6.0 PSIG. This system pressure is also transmitted to the chamber behind the relief valve sleeve. The relief valve then stays closed. The pressure sensing pilot used was obtained from Fisher Controls Company identified as Model Y611 however any suitable pressure sensing pilot may be used. This pilot is the "brains" of the present system. It determines when it is necessary to open the relief valve. The pilot monitors the pressure in the low pressure distribution system. Under stable operating conditions it stays closed. It opens whenever the system pressure rises above setpoint, allowing gas flow through the inspirator block and thereby effecting the opening of the relief valve. Any appropriate source pressure regulator may be used such as the source pressure regulator Fisher Model R922H obtained from Fisher Controls Company of Marshalltown, Iowa. This regulator reduces the source gas pressure from that at the inlet side of the district pressure regulator to the optimum 6 PSIG. In a stable system, where the pressure sensing pilot is closed, this regulator fills all of the space between it and the pressure sensing pilot with 6 PSIG gas. It then stops feeding until the pressure in the space again drops below 6 PSIG. This space includes the internal volume of the inspirator block and the chamber behind the relief valve sleeve. In an upset sYstem, where the pressure sensing pilot is open, this regulator provides a steady stream of 6 PSIG gas to the inlet port of the inspirator block.

Generally, the pressure safety device used in the system of the present invention operates as follows. A main gas supply line conveying gas under pressure of about 20-60 PSIG is extended to a district pressure regulator. The invention will be described throughout wherein the gas in the main gas line is at about 30 PSIG, however it should be understood that any conventionally used pressure is intended such as 20-60 PSIG. The district pressure regulator converts the gas pressure from about 30 PSIG to about ½ PSIG. Pressure regulators are either located at the point where gas is delivered to each individual customer (a service regulator) or in a district regulator station that serves a number of customers (a district pressure regulator). In both cases, a pressure regulator needs a safety device to protect the downstream system and customers from the danger of receiving high pressure gas in the event of a regulator failure. The main gas line continues beyond the district pressure regulator and now carries gas at a pressure of about ½ PSIG. This main gas line is in gas flow connection with the novel safety device of this invention which is on the main gas line downstream from the district pressure regulator. An auxiliary gas line is also extended from the mainline before the district pressure regulator to the safety device of this invention. It does not go through the district pressure regulator. An important feature of the present invention is the use of this auxiliary line to provide gas from the upstream side of the district pressure regulator as a power source as will be later described. This auxiliary line provides gas to the safety device of this invention at a pressure of about 30 PSIG. Thus, one inlet (the A.F.V.) of the safety device of this invention is receiving gas from downstream of the district pressure regulator at a gas pressure of about ½ PSIG and one inlet (the source pressure regulator) of the safety device of this invention is receiving gas via the auxiliary line from upstream of the district pressure regulator at a gas pressure of about 30 PSIG. The gas received at the source pressure regulator at 30 PSIG is converted by the source pressure regulator to gas pressure of about 6 PSIG and conveyed therefrom to gas line connections to the inspirator, pressure sensing pilot and the A.F.V. The gas at 6 PSIG is maintained in these gas lines under stable normal conditions and will not be conveyed further until a subsequent description of the system because of an overpressurization in the main gas line. It has been determined that the inspirator generates its peak or maximum vacuum at −6.1 PSIG with an inlet pressure between 5.0 and 7.0 PSIG. Therefore, it is important that the source pressure regulator convert the pressure to about 6.0 PSIG. This 6.0 PSIG gas is normally maintained in the system through the inspirator. The A.F.V. or gas relief valve will contain gas at ½ PSIG at the sleeve internal portion of its structure and will contain gas at 6.0 PSIG at the sleeve external portion of its structure. The sleeve will be in a closed mode preventing any gas from venting therefrom to the atmosphere. The pressure sensing pilot which senses the excess gas pressure in the system is also in a closed mode during normal pressure system conditions. The pressure sensing pilot has a set pressure sensitive gas closure means that will only open upon the pressure exceeding that set pressure. As noted earlier, the pressure sensing pilot is the brains of the gas pressure safety structure and system of the present invention. It will sense when the relief valve should be opened or remain closed. It opens whenever the pressure in the system exceeds the setpoint thereby permitting gas flow through the inspirator block at about 5-7.0 PSIG thereby causing a vacuum effect which assists in opening the relief valve to vent excess gas to the atmosphere.

DESCRIPTION OF THE DRAWING AND PREFERRED EMBODIMENTS

Figure 1:
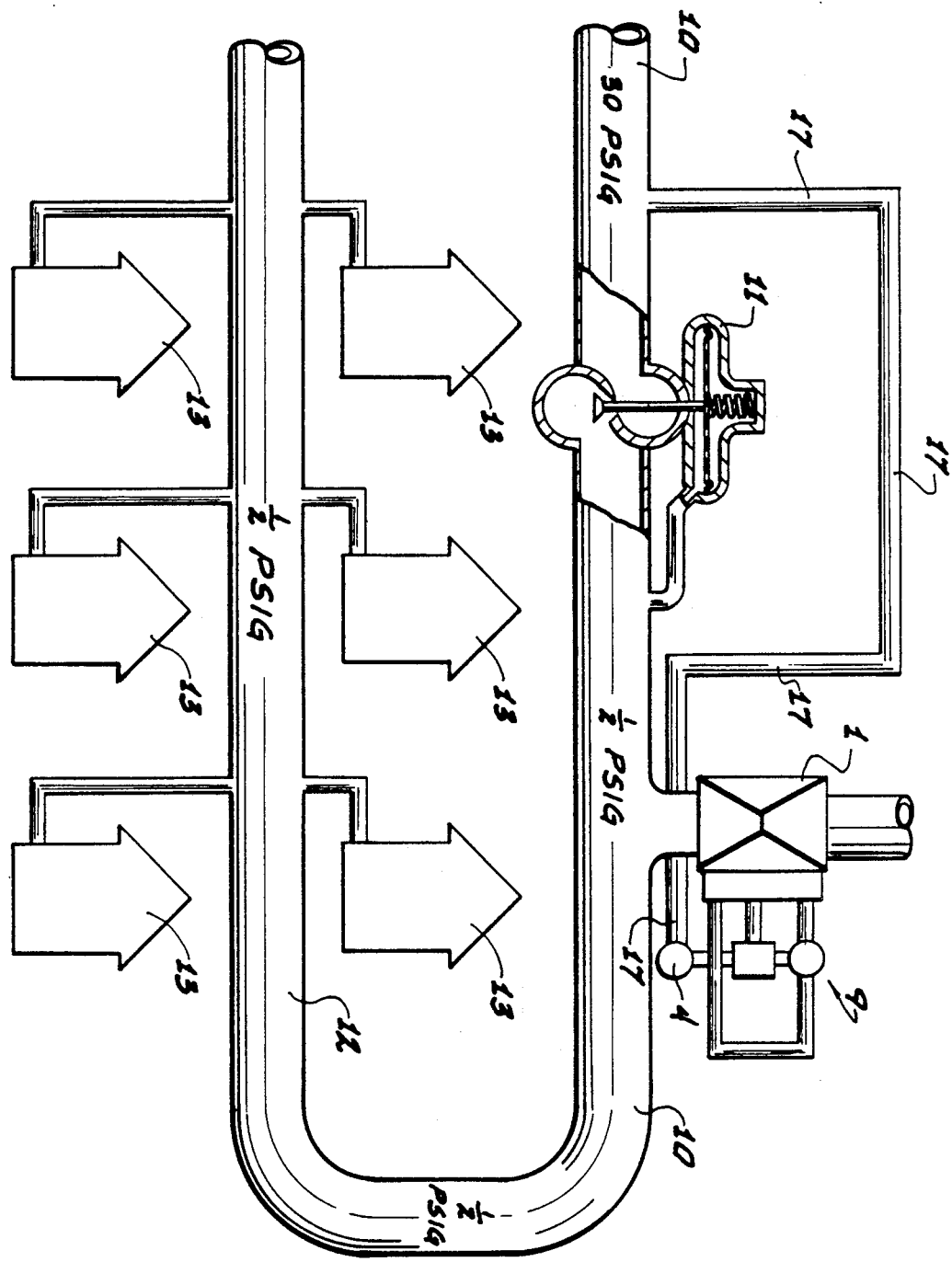
FIG. 1 is a schematic view of the natural gas distribution system including the present invention.

In FIG. 1 the gas distribution system of this invention is illustrated having main gas supply line 10 which conveys gas from a supply piping system to a district pressure regulator 11. The pressure in the main gas supply line is generally maintained at a pressure of from about 20 to 60 PSIG. This pressure will be referred to throughout this disclosure as "about 30 PSIG". At pressure regulator 11 the gas pressure is reduced from about 30 PSIG to about ¼ PSIG. Gas distribution companies use pressure to transport gas throughout their systems. Gas pressures as noted above of 20 to 60 PSIG are economical and efficient and therefore common in these type systems. However, the appliances found in most residential customers' homes are designed to operate at low pressure, usually around ¼ PSIG. Pressure regulator 11 is a device commonly used to reduce the gas pressure to ¼ PSIG for transportation to the household. Pressure regulators like 11 require a safety device to protect the downstream system and customers from the danger of receiving high pressure gas in the event regulator 11 fails for any reason. After the gas in the system passes through district pressure regulator 11 and is reduced to ¼ PSIG it continues to the safety device of this invention. This safety device 9 is in gas flow connection with a gas venting means 1. Gas venting means 1 can be any suitable gas exhaust or venting means that can be vent-opened by the action of a vacuum. In place of AFV 1 shown in the drawings, the following gas venting means may be used in the present invention:

A. Diaphragm Operated Control Valve Type EWD control valve body and Type 657 diaphragm actuator, both manufactured by Fisher Controls Company located in Marshalltown, Iowa as described in Bulletin 51.1:EW dated March 1979 and Bulletin 61.1:657 dated July 1975.

B. Direct Operated Safety Relief Valve — Model 250-DW or Model 250-S safety relief valve manufactured by Rockwell International's Measurement and Flow Control Division located in Pittsburgh, Pa. as described in Bulletin R 1450 revision 3, dated 1980.

C. Piston Operated Plug Valve — Figure D-451 round port, full pipe area, cylindrical plug valve manufactured by Resun Manufacturing Company of Tomball, Tex. as described in Catalog P5-87 operated by a CB series double acting valve actuator manufactured by Bettis Valve Actuator Company of Houston, Tex. as described in Bulletin CB-1013-B dated Aug. 15, 1977.

One suitable gas venting means is an axial flow valve (A.F.V.) 1 as shown in FIGS. 1–3 and 4. The gas transport or gas line 10 extends past the safety device 9 and in a stable situation feeds gas at about ¼ PSIG to gas mains 12 on a residential street. Gas main 12 then conveys the gas to residential gas services or homes 13. An auxiliary gas line 17 extends from main gas line 10 at a point upstream from district pressure regulator 11 and connects on its opposite end to source pressure regulator 4. An important feature of this invention is the use of an auxiliary gas line 17 and of a safety device 9 that is not totally dependent upon main line 10 pressure downstream of the district pressure regulator for activation. This feature eliminates the problems associated with build up. It also allows the use of venting means such as the Axial Flow valve 1 that normally would not function in a ¼ PSIG system.

Figure 2:
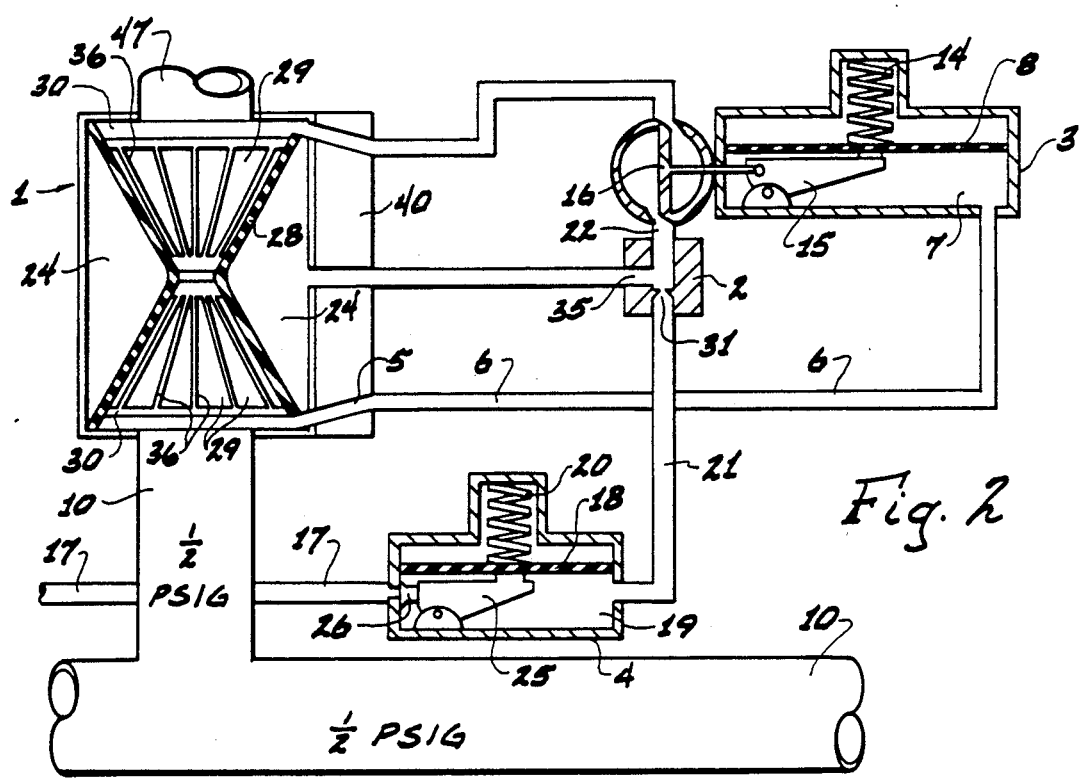
FIG. 2 is a schematic view of the gas pressure safety structure and system of the present invention in a normal stable mode.

Given a stable distribution system of FIG. 1 and FIG. 2 with a system pressure of ¼ PSIG, the Axial Flow Valve (A.F.V.) 1 is in the closed position. The system pressure of ¼ PSIG is transmitted through the bottom port 5 of the AFV 1 and the sense line 6 to the underside 7 of the pressure sensing pilot 3. This pressure acts against the diaphragm 8 with a pressure multiplied by area relationship creating a force upward. This force is resisted by a downward force created by a preset compression in spring 14. The ability to control the compression in this spring makes it possible to vary the pressure sensing pilot's 3 setpoint.

The diaphragm 8 stays flat as long as the spring 14 force downward exceeds the pressure force upward. This diaphragm position is transmitted through linkage 15 to valve 16. The internal geometry is structured such that this diaphragm position results in a closed valve.

The same activity takes place in the source pressure regulator 4. The pressure beneath its diaphragm 18 in area 19 acts upward against the spring force generated by spring 20. In this system, this regulator has a spring compression equal to an upward pressure of about 6.0 PSIG. The area 19 beneath the diaphragm 18, tubing 21 and 22, the inspirator 2 and the area 24 behind the AFV sleeve 28, all act as one chamber. The same pressure is present in this entire chamber during stable conditions. If the pressure in this chamber was slightly below 6.0 PSIG, diaphragm 18 would move down slightly. This motion would be transmitted through linkage 25 to valve 26. Valve 26 would open slightly, allowing enough gas to flow from the upstream side of the district pressure regulator through auxiliary gas line or tube 17 into the chamber to raise the internal chamber pressure to 6.0 PSIG. At that time diaphragm 18 would move upward thereby closing valve 26.

The 6.0 PSIG gas trapped in area 24 forces the rubber sleeve 28 into the closed position denoted in FIG. 2. This seals the slots 29 in the cage 30 of gas venting means or AFV 1, trapping the ¼ PSIG gas beneath the AFV 1. This set of conditions represents a stable, closed system of FIG. 2. The relief system can stay in this position indefinitely, unless some event disrupts it. Most relief valves or gas venting means 1 stay in this position for their entire service lives.

Figure 3:
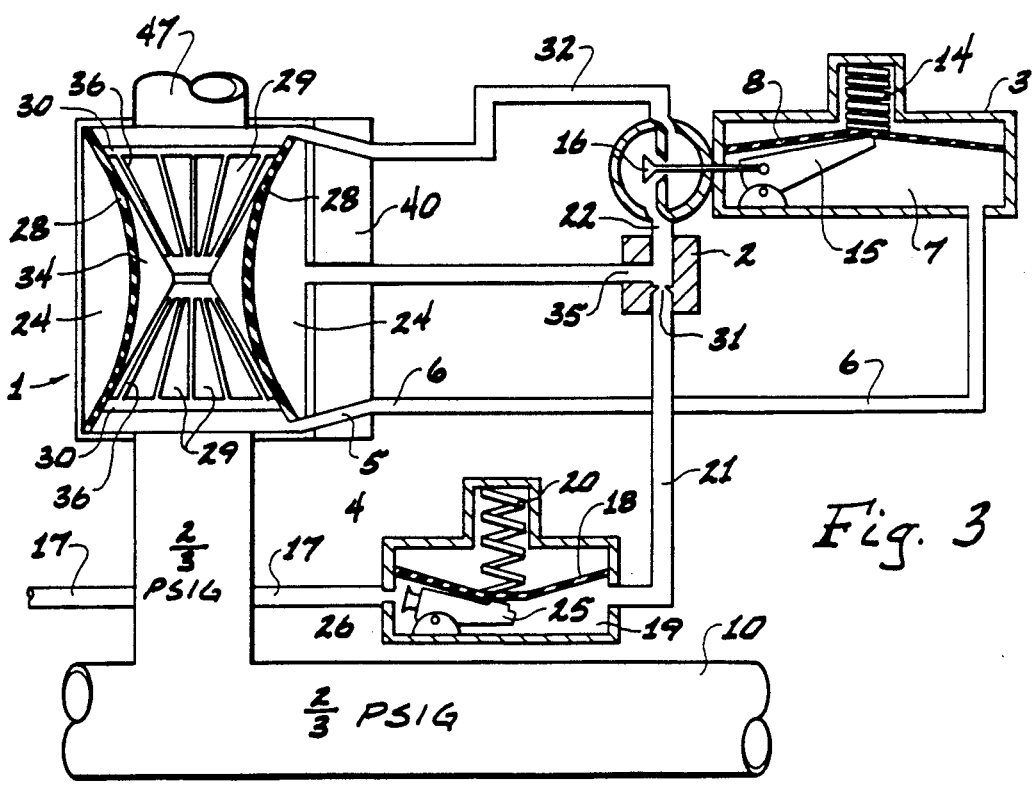
FIG. 3 is a schematic view of the gas pressure safety structure and system of the present invention after the failure of the district pressure regulator.

The stability of this system is disrupted when the district pressure regulator fails as illustrated in FIG. 3. In a failed state, the district pressure regulator 11 (of FIG. 1) fails to keep the downstream system pressure below ⅜ PSIG. When the downstream system pressure builds in main line 10 beyond ⅜ PSIG, so does the pressure sensed by the pressure sensing pilot 3. When the upward force generated by the pressure in area 7 increases beyond the downward force generated by spring 14, diaphragm 8 moves up. This motion is translated by linkage 15 into the opening of valve 16.

As valve 16 opens, the gas in tubing 21 and 22, the inspirator 2 and in the chamber behind the sleeve 28 flows to the atmosphere through tube 32. The gas in area 19 beneath the diaphragm 18 in the source pressure regulator 4 also follows this path. As the force generated by the pressure beneath diaphragm 18 drops below the force generated by spring 20, the diaphragm 18 drops. This motion is translated by linkage 25 into the opening of valve 26. Gas from the upstream side of district pressure regulator 11 flows through tubing 17 and valve 26 and through the downstream tubing system to the atmosphere. The source pressure regulator 4 will continue to refill the system with 6.0 PSIG gas as long as the pressure sensing pilot valve 16 stays open.

In this condition, there is a constant flow of 6.0 PSIG gas through the inspirator 2. The gas flows at a constant rate in through tube 21 (into inlet port of the inspirator) and out through tube 22 (through exhaust port of the inspirator). Venturi or aperture 31 is a precisely contoured restriction in the path through the inspirator 2. Thus, the gas passing through this venturi 31 must accelerate as it moves through its smaller area. The property of conservation of energy holds that any increase in the velocity of a gas produces a proportional decrease in pressure. The location of the highest velocity and therefore lowest pressure occurs at a point just past venturi 31. The branch line 35 running to tube (at inspirator jacket port) connects to the run through the inspirator at said point.

The actual pressure at point 31 is a function of the pressure flowing into the inlet port of inspirator 2 through tube 21. It has been considered that the most negative pressure possible, −6.1 PSIG, is achieved with an inlet pressure via tube 21 to the inspirator 2 of between 5.25 and 7.0 PSIG. This is the basis in the preferred embodiment for the decision to set the source pressure regulator 4 at 6.0 PSIG.

Since gas flows from regions of higher pressure to regions of lower pressure, the gas in tube 23 and in area 24 behind the sleeve 28 flows to the point just past venturi 31, and then out through tube 22 and tube 32 to AFV venting pipe 47 and to the atmosphere until the time at which the pressure in area 24 is equal to the pressure at the point just past venturi 31.

As the pressure in area 24 drops, the sleeve 28 moves from position as shown in FIG. 2 to the gas venting position as shown in FIG. 3. The pressure drop required to move the sleeve depends on the system pressure at the inlet side of the AFV 1. Rubber sleeves 28 are constructed with an inherent shape that keeps them close to the cage 30 as shown in FIG. 2. It takes a difference in pressure between cage 30 inside area 34 and area 24 of 5.5 PSIG to overcome the natural shape of the sleeve 28 and move it from position of FIG. 2 to position shown in FIG. 3.

In high pressure relief applications, where the pressure at the inlet side of the AFV 1 is greater than 5.5 PSIG, simply evacuating the area 24 is sufficient to allow the gas beneath or inside the AFV 1 to push the sleeve 28 from the closed position shown in FIG. 2 to the open gas venting position shown in FIG. 3. The venturi 31 and the inspirator 2 are not present in high pressure relief systems.

In low pressure systems where the AFV 1 experiences inlet pressures of ⅜ PSIG, another means of opening the sleeve 28 is required. The inspirator 2 is the means for artificially creating this pressure differential across the sleeve 28. Constructing the low pressure relief system as described allows for the placement of a −6.1 PSIG behind or outside the sleeve in area 24. With an inlet pressure of ⅜ PSIG in area 34, the sleeve 28 realizes a pressure differential from area 34 to area 24 of 6.7 PSIG. This is enough differential to move the sleeve 28 from closed position of FIG. 2 to the open position of FIG. 3. This system will work with an inlet pressure of ⅜ PSIG as long as a pressure of −4.7 PSIG or less is achieved behind the sleeve in area 24. This can be realized with a source pressure regulator 4 setting anywhere between 3.5 and 12.0 PSIG.

It should be mentioned at this point that the vacuum effect caused at branch line 35 (and inspirator jacket port) which pulls jacket 28 outwardly is a critical feature of this invention.

Figure 4:
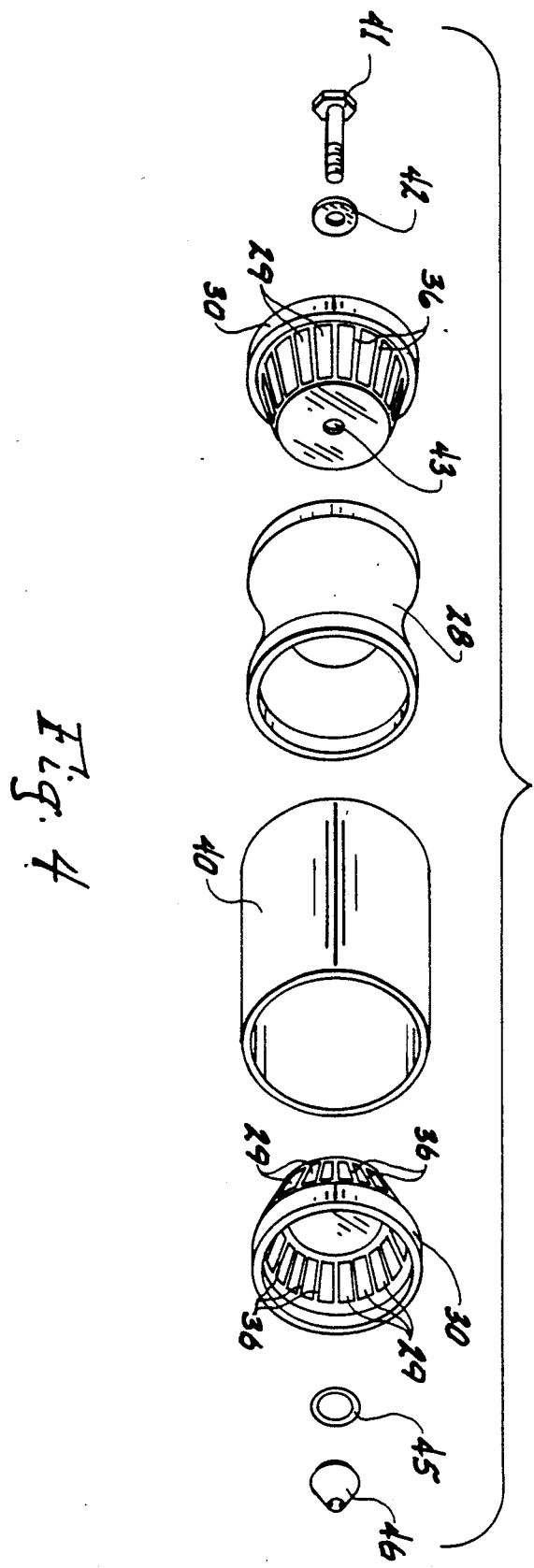
FIG. 4 is a perspective view of the axial flow valve that is used in a preferred embodiment of this invention.

Moving the sleeve 28 from the position shown in FIG. 2 to the position shown in FIG. 3 creates the area 34. This area 34 serves as a pathway from the inlet side of the cage 30 to the outlet side 34 and out to the atmosphere. All of the excess gas allowed into the piping system by the failed district pressure regulator 11 flows out of the system to the atmosphere through this path, from the inlet cage through area 34 and out through outlet cage openings 29 of AFV 1. The cage 30 resembles an hourglass with spines or grill work 36 and openings 29 between each spine 36. Rubber sleeve 28 completely covers the spines 36 and openings 29 as it encircles the entire structure. An AFV housing 40 encloses the entire AFV structure when it is assembled. FIG. 4 shows the AFV 1 in a disassembled mode having a two-part cage 30, i.e. a bottom and top. When assembled, cage 30 is enclosed by resilient sleeve 28 which closes off openings 29 and prevents gas venting therethrough. When the vacuum is caused by inspirator 2 it pulls sleeve 28 away from cage 30 and allows gas to vent out openings 29. The resiliency of sleeve 28 is pre-selected so that it will move away from the cage 30 as shown in FIG. 3 upon the vacuum effect caused by inspirator 2 and the difference in pressure created at points 24 and 34. To assemble AFV 1 bolt 41 is inserted through washer 42, through bottom cage aperture 43, housing 40 is placed around bottom cage 30 and top cage 30 inserted at the top of housing 40. The bolt 41 is continued through upper cage aperture 44 through 0-ring 45 and secured in place by fairing nut 46.

If another change in the system occurs resulting in the district pressure regulator 11 returning to normal, satisfactory operating conditions, this relief system will react and re-seal itself. If the pressure in the system drops below ⅜ PSIG, the pressure in the lower chamber 7 in the pressure sensing pilot 3 also drops below ⅜ PSIG. At that point the diaphragm 8 is forced down by spring 14. The linkage 15 translates that movement into the closure of valve 16. The source pressure regulator 4 continues to feed until the chamber created by tubes 21 and 22, the inspirator 2 and the area 24 behind the sleeve 28 are all filled with 6.0 PSIG gas. The presence of this gas in area 24 causes the sleeve to move from position of FIG. 3 to the position of FIG. 2. This in turn closes off path in area 34, ending the flow of gas to the atmosphere.

At this point the system will have again achieved a stable, closed position. The system will stay in this position until another event disrupts its stability.

Below are listed the components of the safety device in a preferred embodiment of the present invention.
(1) Axial flow valve — 300 or 600 Series Model, manufactured by American Meter Company located in Philadelphia, Pa. 19116.
(2) Inspirator — Inspirator Control Manifold manufactured by American Meter Company located in Philadelphia, Pa. 19116 as described in American Meter Company Bulletin 1M9725, August 1988.

(3) Pressure Sensing Pilot — Type Y610-21, Y611 or Y600 Series manufactured by Fisher Controls Company located in Marshalltown, Iowa described in Bulletins 1.3:Y610 January 1983 and in Bulletin 71.1:Y600, February 1987.

(4) Source Pressure Regulator — Type R922 and R922H manufactured by Fisher Controls Company located in Marshalltown, Iowa described in Bulletin 71.1:R922, February 1981.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A gas distribution system comprising in gas flow connection a pressure regulator, a main gas line, an auxiliary gas line, and a gas pressure safety structure, said pressure regulator located on substantially a front portion of said gas distribution system, said auxiliary gas line extending directly from a point on said main gas line prior to said district pressure regulator to said gas pressure safety structure, said gas pressure safety structure comprising in gas flow connection a source pressure regulator, an inspirator, a pressure sensing pilot, and a gas venting means, said inspirator having vacuum causing means in gas flow connection with said gas venting means, said gas venting means having means to allow gas to vent to the atmosphere when opened by a vacuum effect caused by said inspirator.

2. The gas pressure distribution system of claim 1 wherein said pressure source regulator has means for reducing gas pressure and means for conveying this reduced pressure gas to said inspirator.

3. The gas pressure distribution system of claim 1 wherein said inspirator comprises a T-shaped conduit having an inlet port, an exhaust port and a jacket port, said inlet port having means for gas flow connection to said source pressure regulator.

4. The gas pressure distribution system of claim 1 wherein said inspirator comprises a T-shaped conduit having an inlet port, an exhaust port and a jacket port, said exhaust port having means for gas flow connection to said pressure sensing pilot and said gas venting means.

5. The gas pressure distribution system of claim 1 wherein said inspirator comprises a T-shaped conduit having an inlet port, an exhaust port and a jacket port, said jacket port having means for gas flow connection to said gas venting means.

6. The gas pressure distribution system of claim 1 wherein said source pressure regulator has means for reducing gas pressure and means for conveying this reduced pressure gas to said inspirator and to a location adjacent an activating means for said pressure sensing pilot.

7. The gas pressure distribution system of claim 1 wherein said inspirator has an inlet port, an exhaust port and a jacket port, said jacket port providing vacuum causing means which are in gas flow connection to said gas venting means.

8. The gas pressure distribution system of claim 1 wherein said source pressure regulator has means to reduce gas pressure from a higher pressure to a lower pressure of about 5.0 to 7.0 PSIG.

9. The gas pressure distribution system of claim 1 wherein said source pressure regulator has means to reduce and maintain gas pressure to about 6.0 PSIG.

10. A gas distribution system and structure comprising in combination in gas flow connection a pressure regulator, a main gas line, an auxiliary gas line, and a gas pressure safety structure, said pressure regulator located at substantially a front portion of said gas distribution system, said gas pressure safety structure comprising in gas flow connection a source pressure regulator, an inspirator, a pressure sensing pilot and a gas venting means, said auxiliary gas line extending directly from a point on said main gas line prior to said pressure regulator to said source pressure regulator of the pressure safety structure, said auxiliary gas line containing gas at a pressure that exists in said gas distribution system prior to pressure reduction by said pressure regulator, said inspirator having vacuum causing means in gas flow connection with said gas venting means, said gas venting means having means to allow gas to vent to the atmosphere when opened by a vacuum effect caused by said inspirator.

11. The gas pressure distribution system and structure of claim 10 wherein said pressure source regulator has means for reducing gas pressure and means for conveying this reduced pressure gas to said inspirator.

12. The gas pressure distribution system and structure of claim 10 wherein said inspirator comprises a T-shaped conduit having an inlet port, an exhaust port and a jacket port, said inlet port having means for gas flow connection to said source pressure regulator.

13. The gas pressure distribution system and structure of claim 10 wherein said inspirator comprises a T-shaped conduit having an inlet port, an exhaust port and a jacket port, said exhaust port having means for gas flow connection to said pressure sensing pilot and said gas venting means.

14. The gas pressure distribution system and structure of claim 10 wherein said inspirator comprises a T-shaped conduit having an inlet port, an exhaust port and a jacket port, said jacket port having means for gas flow connection to said gas venting means.

15. The gas pressure distribution system and structure of claim 10 wherein said source pressure regulator has means for reducing gas pressure and means for conveying this reduced pressure gas to said inspirator and to a location adjacent an activating means for said pressure sensing pilot.

16. The gas pressure distribution system and structure of claim 10 wherein said inspirator has an inlet port, an exhaust port and a jacket port, said jacket port providing vacuum causing means which are in gas flow connection to said gas venting means.

17. The gas pressure distribution system and structure of claim 10 wherein said source pressure regulator has means to reduce gas pressure from a higher pressure to a lower pressure of about 5.0 to 7.0 PSIG.

18. The gas pressure distribution system and structure of claim 10 wherein said source pressure regulator has means to reduce and maintain gas pressure to about 6.0 PSIG.

19. A natural gas distribution system comprising in gas flow connection a district pressure regulator, a main gas line, an auxiliary gas line, and a gas pressure safety structure, said district pressure regulator located at substantially a front portion of said gas distribution system, said gas pressure safety structure comprising in gas flow connection a source pressure regulator, an inspirator, a pressure sensing pilot and a gas venting means, said auxiliary gas line extending directly from a point on said main gas line prior or upstream to said pressure regulator to said source pressure regulator of said pressure safety structure, said auxiliary gas line containing gas at a pressure of from about 20-60 PSIG which is the pressure existing in said system prior to said pressure regulator, said inspirator having vacuum causing means in gas flow connection with said gas venting means, said vacuum causing means adapted upon overpressurization in said system to activate said gas venting means and thereby allow gas to vent to the atmosphere through said gas venting means.

20. The gas pressure distribution system of claim 19 wherein said pressure source regulator has means for reducing gas pressure and means for conveying this reduced pressure gas to said inspirator.

21. The gas pressure distribution system of claim 19 wherein said inspirator comprises a T-shaped conduit having an inlet port, an exhaust port and a jacket port, said inlet port having means for gas flow connection to said source pressure regulator.

22. The gas pressure distribution system of claim 19 wherein said inspirator comprises a T-shaped conduit having an inlet port, an exhaust port and a jacket port, said exhaust port having means for gas flow connection to said pressure sensing pilot and said gas venting means.

23. The gas pressure distribution system of claim 19 wherein said inspirator comprises a T-shaped conduit having an inlet port, an exhaust port and a jacket port, said jacket port having means for gas flow connection to said gas venting means.

24. The gas pressure distribution system of claim 19 wherein said source pressure regulator has means for reducing gas pressure and means for conveying this reduced pressure gas to said inspirator and to a location adjacent an activating means for said pressure sensing pilot.

25. The gas pressure distribution system of claim 19 wherein said inspirator has an inlet port, an exhaust port and a jacket port, said jacket port providing vacuum causing means which are in gas flow connection to said gas venting means.

26. The gas pressure distribution system of claim 19 wherein said source pressure regulator has means to reduce gas pressure from a higher pressure to a lower pressure of about 5.0 to 7.0 PSIG.

27. The gas pressure distribution system of claim 19 wherein said source pressure regulator has means to reduce and maintain gas pressure to about 6.0 PSIG.

* * * * *